United States Patent [19]

Bailey et al.

[11] Patent Number: 5,726,880
[45] Date of Patent: Mar. 10, 1998

[54] METHOD OF AND APPARATUS FOR CONTROLLING A PROCESS

[75] Inventors: Graham Bailey, Neuhofen; Helmut Heger, St. Leon-Rot, both of Germany

[73] Assignee: Ranco Incorporated of Delaware, Wilmington, Del.

[21] Appl. No.: 642,403

[22] Filed: May 3, 1996

[30] Foreign Application Priority Data

May 5, 1995 [DE] Germany ............... 195 16 627.2

[51] Int. Cl.⁶ ............... G05B 13/02; F25B 49/04; G05D 23/19
[52] U.S. Cl. ............... 364/177; 364/176; 364/157; 364/162; 395/61; 395/900
[58] Field of Search ............... 364/148–149, 364/150–153, 157–165, 172, 176–177, 550, 551.01; 318/561, 609–610, 632; 395/3, 61, 900, 903, 906

[56] References Cited

U.S. PATENT DOCUMENTS

| | | | |
|---|---|---|---|
| 4,386,397 | 5/1983 | Saeki | 364/148 |
| 5,241,651 | 8/1993 | Ueda | 364/149 |
| 5,336,073 | 8/1994 | Hiraoka | 425/145 |
| 5,371,450 | 12/1994 | Hiraoka | 318/560 |
| 5,371,832 | 12/1994 | Eichfeld et al. | 395/3 |
| 5,410,470 | 4/1995 | Yamaoka et al. | 364/177 |
| 5,420,785 | 5/1995 | Shinskey | 364/177 |

(List continued on next page.)

FOREIGN PATENT DOCUMENTS

| | | |
|---|---|---|
| 0534221A1 | 3/1993 | European Pat. Off. ........ G05B 13/04 |
| 3134180 | 11/1983 | Germany . |
| 3538516 | 5/1987 | Germany . |
| 3631164 | 6/1987 | Germany . |
| 3717555 | 12/1988 | Germany . |
| 3743892 | 12/1988 | Germany . |

(List continued on next page.)

OTHER PUBLICATIONS

Patent Abstracts of Japan, M–1398, vol. 17, No. 198, JP 4–344078 (Apr. 19, 1993).
Patent Abstracts of Japan, M–1586, vol. 18, No. 190, JP 5–346281 (Mar. 31, 1994).
H. Eichfeld, et al., Architecture of a CMOS Fuzzy Logic Controller with Optimized Memory Organnization and Operator Design, Conference Papers of the 1st International Conference on Fuzzy Systems FUZZ–IEEE '92, pp. 1317–1323, 1992.

(List continued on next page.)

*Primary Examiner*—James P. Trammel
*Assistant Examiner*—Cuong H. Nguyen
*Attorney, Agent, or Firm*—Watts, Hoffmann, Fisher & Heinke, Co., L.P.A.

[57] ABSTRACT

The present invention relates to a method of controlling an output variable of a process having long dead times and delay times, for example for controlling the interior temperature of an absorber refrigerator, and also relates to an apparatus for carrying out such a method. The output variable of the process, such as the interior temperature, is sampled and compared with a desired value in order to determine a desired value deviation. In dependence on the determined desired value deviation, a manipulated variable, such as the power supplied to the absorber, is calculated in such a manner that the output variable of the process is brought near to the desired value. After the lapse of a waiting time, a value of the manipulated variable is newly determined. During the waiting time, the manipulated variable is not altered. The waiting time is calculated on the basis of the difference between the value of the manipulated variable and an earlier value of the manipulated variable. A controller for carrying out the method comprises a memory for an earlier calculated manipulated variable and a timer which is designed to receive the earlier calculated value of the manipulated variable and the current value of the manipulated variable, to calculate a waiting time from these and, after the lapse of this waiting time, to start a new calculation of a value for the manipulated variable.

25 Claims, 4 Drawing Sheets

U.S. PATENT DOCUMENTS

| | | | |
|---|---|---|---|
| 5,424,943 | 6/1995 | Hirzle | 364/164 |
| 5,430,642 | 7/1995 | Nakajima et al. | 364/148 |
| 5,513,097 | 4/1996 | Gramckow et al. | 364/148 |
| 5,564,625 | 10/1996 | Straub | 364/137 |
| 5,566,275 | 10/1996 | Kano | 395/81 |
| 5,598,329 | 1/1997 | Niemann | 364/150 |
| 5,640,491 | 6/1997 | Bhat et al. | 395/903 |

FOREIGN PATENT DOCUMENTS

| | | | |
|---|---|---|---|
| 3733396 | 4/1989 | Germany . | |
| 3921329 | 1/1991 | Germany . | |
| 4127553 | 4/1992 | Germany . | |
| 04131765A1 | 3/1993 | Germany | G03B 17/02 |
| 4237810 | 5/1993 | Germany . | |
| 4232826 | 10/1993 | Germany . | |
| 4226383 | 2/1994 | Germany . | |
| 4232752 | 6/1994 | Germany . | |
| 4240788 | 6/1994 | Germany . | |
| 4308541 | 9/1994 | Germany . | |
| 4416364 | 11/1994 | Germany . | |
| 4344078 | 11/1992 | Japan . | |
| 5346281 | 12/1993 | Japan . | |
| 02004089 | 7/1977 | United Kingdom | G05B 5/00 |
| 2106668 | 4/1983 | United Kingdom . | |
| 02146797 | 9/1983 | United Kingdom | G05D 23/00 |
| 2186391 | 8/1987 | United Kingdom . | |
| 02245720 | 1/1992 | United Kingdom | G05B 11/16 |
| 2276252 | 9/1994 | United Kingdom . | |

OTHER PUBLICATIONS

Watanabe, et al., A VLSI Fuzzy Logic Controller, IEEE Journal of Solid–State Circuits, vol. 25, No. 2, pp. 376–382, Apr. 1990.

Anderson, et al., A Rule–Based Adaptive PID Controller, in IEEE pp. 564–569, Jul. 1988.

H. R. Van Nauta Lemke, et al., Fuzzy PID Supervisor, in 24th IEEE Conference on Decision and Control, pp. 602–608, Dec. 1985.

Maiers and Sherif, Applications of Fuzzy Set Theory, IEEE Trans. on Systems, Man, and Cybernetics, vol. SMC–15, No. 1, pp. 175–189, Jan. 1985.

Larsen, Industrial applications of fuzzy logic control, Int. J. Man–Machine Studies, vol. 12, pp. 3–10, 1980.

Procyk, et al., A Linguistic Self–Organizing Process Controller, Dept. of Electrical Engineering; Queen Mary College, Mile End Rd., London E14NS, 1978.

Mamdani, et al., Process Control Using Fuzzy Logic, in "Fuzzy Sets—Theory & Applications to Policy Analysis & Information Sys.", New York, pp. 249–265, 1980.

Sarture, et al., Performance Criteria in Adaptive Control, in Adaptive Control Sys., A Pergamon Press Book, The Mac-Millan Co., New York, pp. 1–10, 1963.

Patent Abstract of EPO for DE 04226383A1, Measurement and control for electronic two–point or proportional controller, Feb. 17, 1994.

Patent Abstract of EPO for DE 03433410A1, Controller with PI behavior & with a device for improving the starting-up behavior, Mar. 20, 1986.

Patent Abstract of EPO for DE 04232826C1, Control stretch dead time measurement, Oct. 28, 1993.

Patent Abstract of EPO for DE 04237810A1, Operating microprocessor closed loop control regulator, May 13, 1993.

METHOD OF AND APPARATUS FOR CONTROLLING A PROCESS

FIELD OF THE INVENTION

The present invention relates to a method for controlling an output variable of a process and to an apparatus for carrying out such a method. The inventive method or apparatus are used, for example, for controlling the interior temperature of an absorber refrigerator.

BACKGROUND OF THE INVENTION

A process generally has an output variable which is capable of being influenced by an input variable of the process. The term "process" in this case denotes any kind of control system, for example an internal combustion engine, an electric motor, a refrigerating unit or a refrigerator, chemical processes and the like. The term "manipulated variable" in this case relates to physical variables which can be directly adjusted in order to thus effect an indirect change of an output variable of the process. The term "output variable" represents a physical variable which is not directly influenced, but rather by variation of the manipulated variable. In the case of the internal combustion engine, possible manipulated variables, are, for example, the throttle valve setting or the quantity of injected fuel, while the output variable is the number of revolutions, the torque or the generated power. In the case of the absorber refrigerator, the manipulated variable is, for example, the supplied heat or electrical energy to the boiler of the absorption refrigeration unit, while the output variable is, for example, the interior temperature of the refrigerator.

Processes of the type to which the present invention relates are generally subject to the influence of disturbing variables which affect the output variable of the process. The influence of disturbing variables makes the indirect control of the output variable by means of the manipulated variable more difficult or even renders such a control impossible. Examples of disturbing variables, for example, in the case of an internal combustion engine, are pressure, temperature and humidity variations in the suctioned air, changes in the engine temperature and the like. In the case of a refrigerator, for example when opening the refrigeration space, warmer air which enters this, variations of the surrounding temperature and the like have a disturbing influence on the interior temperature.

In order to make the output variable (actual value X) of a process follow the desired value w and to minimise the influence of disturbing variables, it has long been known to use a feedback control which produces a manipulated variable Y from the deviation (w−X) of the output variable with respect to the adjusted desired value w, i.e. from the desired value deviation, in order to minimise the desired value deviation and thus make the output variable (the actual value) follow the given desired value as much as possible. In this case, it is desirable to achieve a control behaviour which permits the quickest possible reaction of the output variable to a variation in the given desired value, which has the smallest possible and quickly dying-down control oscillations, and effectively stabilises disturbing variable influences.

The greater the time period which lapses before the output variable of the process reacts to a change in the manipulated variable, i.e. the greater the dead time of the process, and the slower the output variable of the process approaches its stationary value after the dead time has lapsed, i.e. the greater the delay time of the process, the more difficult it is to fulfil the above-mentioned requirements in a satisfactory manner. For example, the interior temperature of an absorber refrigerator displays such a behaviour, i.e. long dead times and delay times. The output variable in the form of the interior temperature reacts only very indirectly to a change in the power supplied to the boiler of the absorption refrigeration unit, the power being the manipulated variable in this case.

Figure 1A:
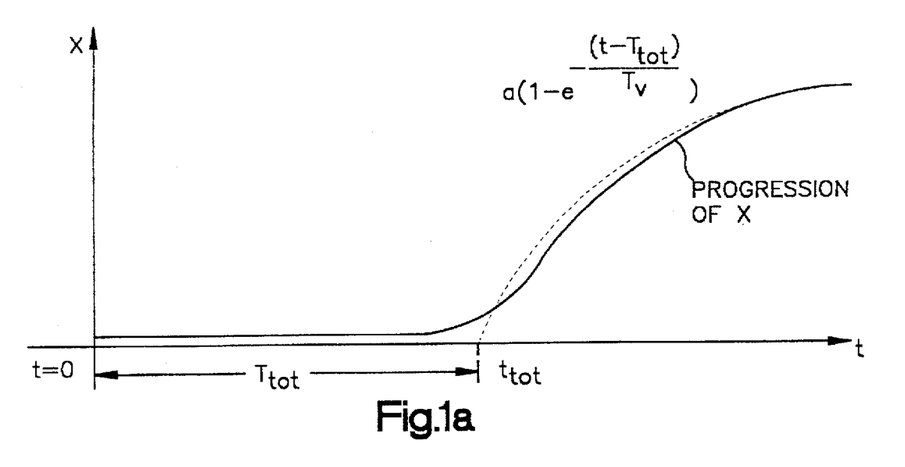
FIGS. 1a and 1b shows an example of an output variable progression in the case of a manipulated variable jump.
Figure 1B:
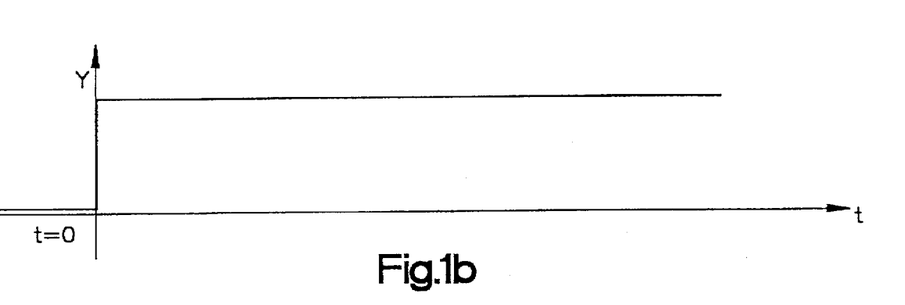

In order to explain the terms "dead time" and "delay time", FIGS. 1A and 1B show an example of the output variable of a process in the case in which the manipulated variable jumps at the time t=0. The progression of the output variable of the process which results can be approximately described by a first phase during the interval t=0 to t=$t_{tot}$, within which phase no noteworthy change in the output variable X occurs. Only after expiry of the interval $T_{tot}$, there is movement of the output variable X in the direction of a new stationary value of the output variable when the desired value has been maintained without change after the jump. The progression of the output variable X in this second phase can be modelled in an approximate manner, for example, by the equation $$X(t)=a*(1-exp[-(t-T_{tot})/T_v])$$

The process parameter $T_v$ occurring in this model represents the delay time of the process and is a measure of the approximating speed of the output variable X towards its stationary value a. However, particularly in non-linear processes which occur in the majority of cases in reality, this model does not represent a complete and precise process description and the invention is not limited to the control of such processes which are capable of being modelled.

SUMMARY OF THE INVENTION

It is the object of the present invention to provide a method of and an apparatus for controlling an output variable of a process which has long dead times $T_{tot}$ and long delay times $T_v$, in such a manner that the output variable displays both a good follow-up behaviour in the case of desired value changes and in which the influences of disturbing variables can be stabilised quickly and with small overshoots.

According to the method of the present invention, a current manipulated variable is calculated in an activity phase of the control procedure. An inactivity phase within which the manipulated variable is not altered follows this activity phase. The next activity phase of the controller then follows the inactivity phase. At the end of each activity phase, a newly calculated manipulated variable is made available. In accordance with the invention, the time period during which the manipulated variable remains unaltered, or in other words, the duration of the inactivity phase, is variable. Preferably, the progression of the manipulated variable passes into the time period between the calculations of manipulated variables. This time period preferably depends on the amount of the difference between the currently calculated manipulated variable and a manipulated variable calculated in a preceding activity phase, the earlier calculated manipulated variable preferably being the manipulated variable calculated in the activity phase directly preceding the current activity phase. By changing this time period during which the manipulated variable is not changed, it is possible to simultaneously achieve good follow-up behaviour and also good control behaviour so that the output variable quickly follows desired value jumps and still has low overshoots.

The controller according to the invention has a memory for a previously calculated manipulated variable as well as means for calculating the difference between the stored, earlier manipulated variable and the currently calculated manipulated variable. The controller also includes a timer which controls the time period between successive manipulated variables and, thus, controls the succession of activity and inactivity phases of the controller. The timer receives the difference between earlier and currently calculated manipulated variables and correspondingly varies the waiting time to the next manipulated variable calculation. Preferably, the functions of calculating a current manipulated variable and the timing function are carried out, for example, by a microprocessor.

Preferably, the waiting time between the current manipulated variable calculation and the next manipulated variable calculation has a monotonically increasing dependency on the amount of the difference between the actually calculated manipulated variable and the directly preceding calculated manipulated variable. For example, two time periods of different durations are provided for the waiting time, and the shorter waiting time is selected for the case in which the difference between the current and the preceding manipulated variable is smaller than a predetermined threshold value. Otherwise, the calculation of the next manipulated variable waits for the longer time period.

According to a preferred exemplary embodiment of the invention, the delay time and/or dead time of the process also passes into the calculation of the waiting time. In this manner, an optimal control behaviour is achieved even in the case of a change in the process parameters. The process parameters consisting of the dead time and the delay time can be determined, for example, from the progression of the output variable of the process as an answer to a manipulated variable jump.

The manipulated variable is calculated in dependence on the desired value deviation of the output variable and preferably includes additional input variables, for example, the change over time of the output variable and/or an earlier manipulated variable, such as the directly preceding calculated manipulated variable.

For example, for the calculation of the waiting time and/or the calculation of the manipulated variable, the controller has corresponding performance characteristics or, for calculation, uses fuzzy-logic processes including the fuzzification of the input variables which enter into the calculation of the manipulated variable or waiting time, the application of a basis of rules onto the fuzzified input variables, and the defuzzification of the obtained fuzzy sets of the output variable, in order to obtain the value of the output variable.

The method according to the invention and the inventive apparatus are suitable for advantageously controlling the temperature of air in the interior of an absorber refrigerator.

BRIEF DESCRIPTION OF THE DRAWINGS

In the following, the invention is described in more detail by way of exemplary embodiments with reference to the enclosed drawings, in which.

DETAILED DESCRIPTION

Figure 2:
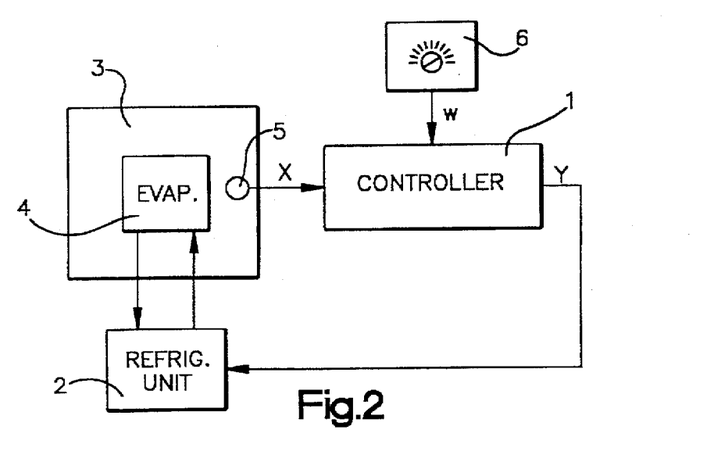
FIG. 2 shows an exemplary embodiment of the invention with reference to an absorber refrigerator.

FIG. 2 shows an exemplary embodiment of a controller 1 of the present invention which is used to control the interior temperature in a refrigerator or refrigeration space 3. The refrigeration space has an evaporator 4 which is connected to a refrigeration unit 2 such as an absorption refrigeration unit in order to remove heat from the refrigeration space 3. In the interior of the refrigeration space, there is a temperature sensor 5 which detects the air temperature in the refrigeration space. The detected air temperature is inputted into the controller 1 as an output variable (actual value X). The controller 1 receives given desired value w of a temperature from a suitable actuator 6. In dependence on these input variables, the controller calculates a value for the manipulated variable Y which is the power continuously supplied to the refrigeration unit 2. The refrigerating effect in the refrigeration space 3 achieved by means of the refrigeration unit and the evaporator is influenced by this manipulated variable. For example, the power is adjusted by means of the pulse-repetition rate of an electric current flowing intermittently through a heating element of the boiler of the absorption refrigeration unit or by alternating current via the current conduction angle. The frequency of the intermittent current is in this case selected to be sufficiently high such that a practically continuous power supply results on account of the integrated properties of the boiler.

It is desirable to maintain the air temperature in the refrigerating space as close as possible to the given desired value w. For this reason, the output variable of the process to be controlled by the controller 1 is the interior air temperature X.

The refrigerating circuit with the refrigeration unit 2 and the evaporator 4 has considerable dead times. A change in the manipulated variable after expiry of this dead time initially leads to a notable change in the temperature of the evaporator 4. As a consequence of the bad thermal conduction of air, there is also a considerable delay time in the reaction of the detected interior temperature, i.e. the output variable X, to a change in the manipulated variable. Further, the delay time depends on the loading of the refrigeration space with goods to be refrigerated.

Figure 3:
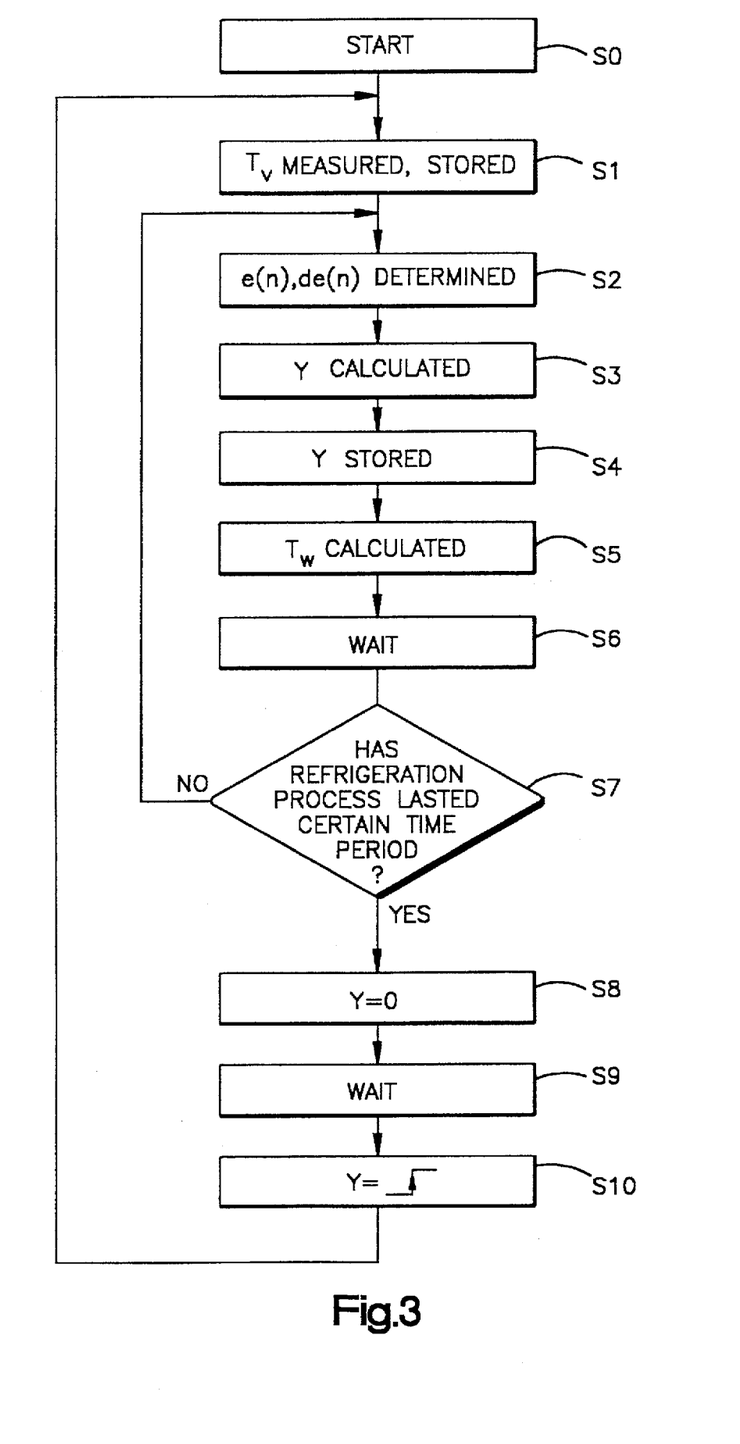
FIG. 3 shows an example of a succession of activity and inactivity phases of the controller and an example of a progression of the manipulated variable.

FIG. 3 shows a flow diagram of the control procedure for controlling the interior temperature according to this exemplary embodiment of the present invention. After switching on the controller in step S0, the delayed time $T_t$ of the process is initially determined in step S1 in order to permit an optimal controller behaviour also in the case of a varying load. For this purpose, the refrigeration unit is switched on by the controller 1 with, for example, a jump, i.e. exposed to a manipulated variable jump in order to operate at a predetermined constant power for a specified time which is greater than the dead time $T_{tot}$ of the process. After this predetermined time has lapsed, the increase of the curve of the interior temperature overtime or a mean increase over a predetermined time period is detected and the delay time $T_v$ is determined from this.

In the following step S2, the actual procedure of controlling the interior temperature begins. For this purpose, in this exemplary embodiment, the deviation of the actual value of the temperature from the given desired value is determined. Further, the momentary change of the interior temperature is determined. In step S3, the controller 1 calculates a new manipulated variable (step S3) from the desired value deviation, from the interior temperature change and from the value of the previous manipulated variable and stores this newly calculated manipulated variable in step S4. This newly calculated manipulated variable is inputted into the refrigeration process. The controller additionally calculates a waiting time $T_w$ in step S5 during which no control procedure takes place and the calculated manipulated variable is maintained constant. This waiting time is calculated on the basis of the newly calculated, current manipulated variable and the preceding manipulated variable. If the current manipulated variable Y(n) differs from the previously calculated manipulated variable, for example the directly preceding calculated manipulated variable Y(n−1), by more than a predetermined value, when the controller extends the waiting time until calculation of the next manipulated variable and maintains the current manipulated variable Y without change during the waiting time (S6). By including the manipulated variable change in the waiting time, it is possible to achieve an optimal control behaviour in the case of both desired value jumps and optimal control behaviour when stabalizing disturbances. As a result of the fact that the reaction of the process during a longer waiting time is awaited when there are large manipulated variable jumps or large desired value jumps before a new manipulated variable calculation takes place, the behaviour of the process can enter into the control procedure with greater accuracy and overshoots can be avoided in this manner. On the other hand, the controller can react quickly to disturbing influences by way of short waiting times in the case of small manipulated variable changes and quickly stabilise such influences.

When calculating the waiting time in S5, the delay time determined in step S1 and, thus, the loading of the interior space with goods to be refrigerated are taken into account. The longer the detected delay time, the longer the waiting time until calculation of a new manipulated variable.

After the waiting time has elapsed, it is examined in step S7 how long the refrigeration step has lasted up to that point. If it is discovered in step 7 that the refrigeration process has lasted a certain time period, then a changeover takes place to step S8 for a thawing process. Otherwise, the control procedure is continued with step S2.

In step S8, the power supplied to the refrigeration unit is switched off and it is waited in step S9 in order to thaw ice which has formed on the evaporator 4. After this, in step S10, a manipulated variable jump is effected analogously to the procedure upon switching on in S0. Following this, the delay time of the process is newly determined and stored in S1 for this to be available for the calculation of the waiting time in S5. In this manner, even when there is a variation in the process parameters, i.e. when there is varying lead of the refrigerator, the control behaviour can be optimally adapted.

Figure 4:
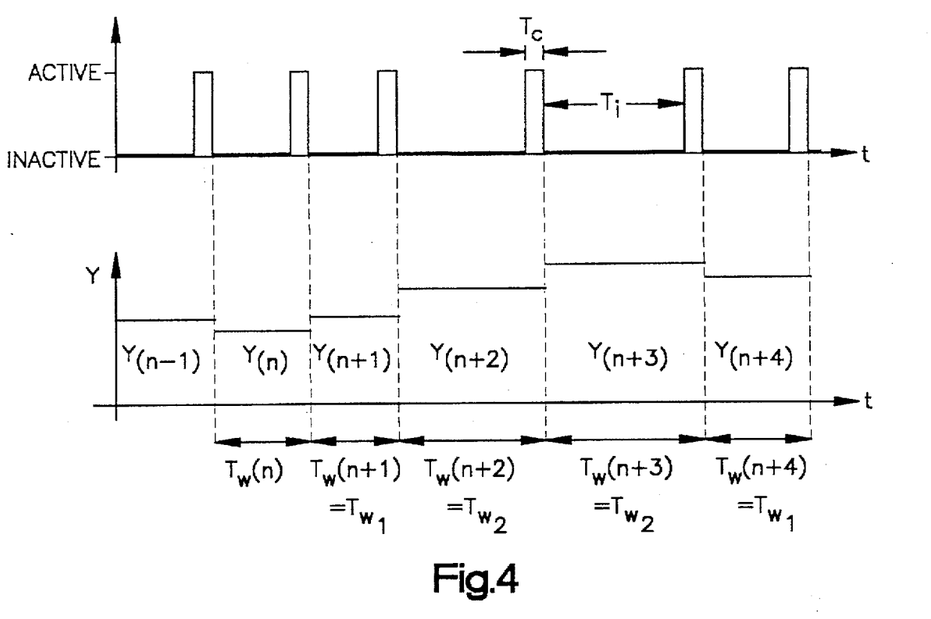
FIG. 4 shows a flow diagram for explaining the operating phases of the controller of this exemplary embodiment.

FIG. 4 shows in the upper part of the diagram a succession of activity cycles of a duration $T_c$ which the controller requires in order to carry out the calculation of the new manipulated variable and of the waiting time $T_w$ during which the newly calculated manipulated variable is kept constant. In this case, a progression of the manipulated variable takes place as is shown in an approximated manner in the lower part of the diagram of FIG. 4. If the manipulated variable makes a jump which is greater than a predetermined threshold value, then the waiting time is extended until calculation of a new manipulated variable. It has been shown that a satisfactory control behaviour can already be achieved when the controller, in dependence on the magnitude of the manipulated variable jump, chooses from two waiting times of different durations which are not dependent on the height of the manipulated variable jump. The shorter waiting time is selected when the manipulated variable jump is below the predetermined threshold, whereas the longer waiting time is selected in other cases.

Preferably, the longer and shorter waiting times are dependent on the delay time of the process, i.e. dependent on the loading condition of the refrigerator. The greater the load, the longer the waiting times.

The calculation time $T_c$ required for calculating the new manipulated variable and the waiting time, i.e. the duration of the activity phase, is negligibly short in comparison to the duration of inactivity phase $T_i$ in this exemplary embodiment so that the waiting time $T_w$ and the duration of the inactivity phase $T_i$ are practically the same. The length of the waiting time depends on the process to be controlled and lies in the order of magnitude of the dead time of the process.

Figure 5:
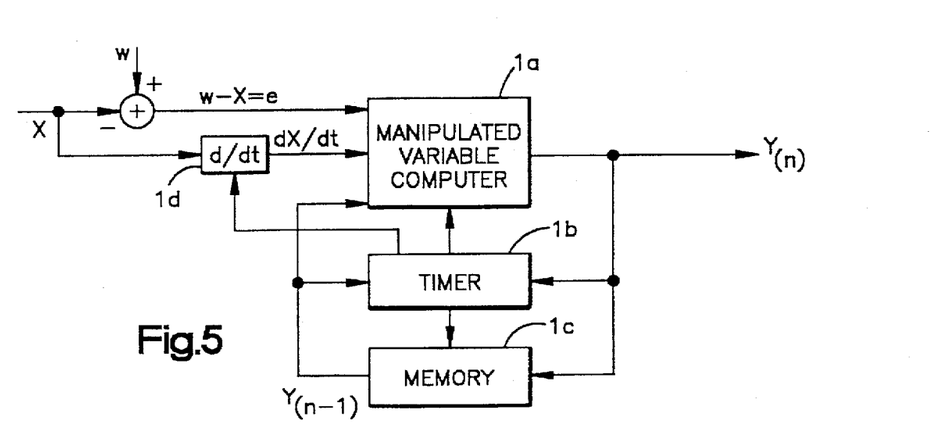
FIG. 5 shows a block diagram of an exemplary embodiment of a controller.

FIG. 5 shows a block diagram of an exemplary embodiment of the inventive controller. The controller comprises a manipulated variable computer 1a, a timer 1b and a memory 1c. The manipulated variable computer 1a receives as input variables the desired value deviation e=(w−X), the variation over time of the desired value deviation de=(d/dt)(X) and the previous manipulated variable Y(n−1). The manipulated variable computer 1a calculates a new manipulated variable Y(n) from these input variables. The variation over time de of the desired value deviation is determined by means of an analogue or discrete differential element 1 d such as a microprocessor. The memory 1c stores the previous manipulated variable Y(n−1) before the manipulated variable computer 1a issues a new manipulated variable Y(n).

The timer 1b serves to calculate the waiting time $T_w$ during which the manipulated variable Y(n) remains unchanged and controls the inactivity and activity phases of the manipulated variable computer 1a via the connection with the manipulated variable computer. For the calculation of the waiting time, the timer receives the newly calculated manipulated variable Y(n) and the preceding manipulated variable Y(n−1) from the memory 1c. The timer additionally controls the thawing procedure at regular time intervals and determines the delay time $T_v$ of the process at the beginning of the next refrigeration phase from the drop in the interior temperature. Alternatively or additionally, the temperature progression of the interior temperature during the thawing phase can be used for determining the delay time. Finally, the timer controls the actualisation of the memory 1c. The operations of the manipulated variable computer and of the timer are preferably carried out by a single microprocessor, but this can also be done with separate units. For the calculation of the manipulated variables, suitable analogue-digital converters are arranged ahead of the manipulated variable computer. The manipulated variable Y exists in dependence on the process as a pulse width modulated digital signal for power adjustment, or as a numeric digital value which is inputted into the process after transformation into an analogue value.

Figure 6:
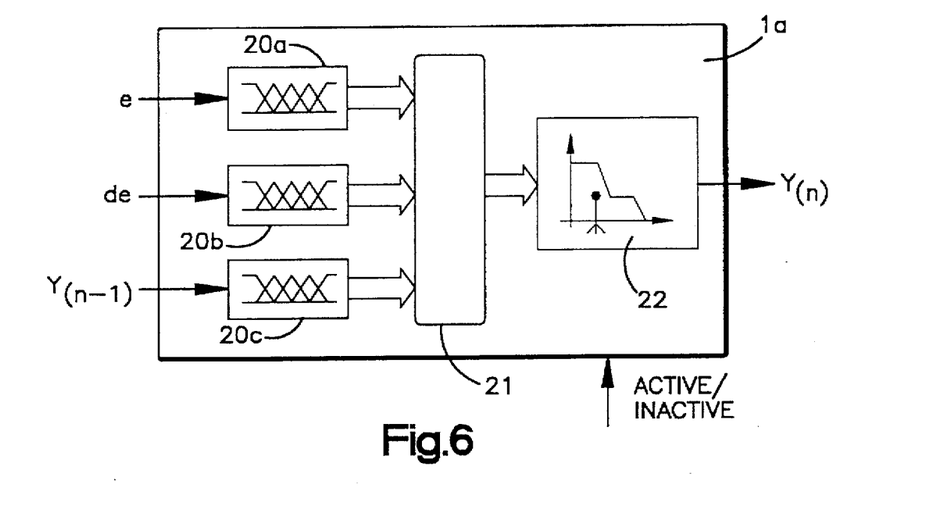
FIG. 6 shows an exemplary embodiment of a controller component using fuzzy logic.

The calculation of the manipulated variable by means of the manipulated variable computer 1a is preferably carried out by accessing a performance characteristic in a performance characteristic memory provided for this purpose. According to a further preferred embodiment, the manipulated variable computer 1a uses fuzzy logic for calculating the manipulated variable. FIG. 6 shows the essential operational components of a manipulated variable computer 1a based on fuzzy logic. The input variables consisting of desired value deviation e, variation over time of the desired value deviation or variation over time of the interior temperature de and the preceding manipulated variable Y are fuzzified in fuzzification units 20a to 20c. A rule basis 21 includes a set of rules which logically switch linguistic terms of the respective input variables with linguistic terms of the manipulated variables to be calculated. Depending on the level of association of the input variables with the fuzzy sets of the linguistic terms, different grades of fulfilment of the rules in the base 21 result. The unification sets of the respective result-fuzzy sets of the active rules in the rule basis 21 produces the fuzzy set of the newly calculated manipulated variable. A sharp value of the new manipulated variable Y is obtained from this fuzzy set by defuzzification, for example according to the point of concentration method. The use of fuzzy logic by the manipulated variable computer 1a brings the advantage that a large performance characteristic memory is not required and that an optimal control behaviour can be achieved by way of modification of the rules in the rule basis 21.

Figure 7:
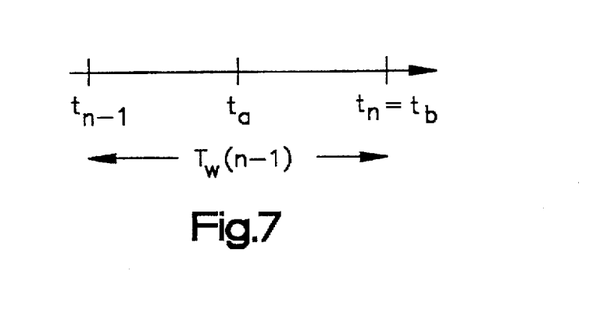
FIG. 7 shows an exemplary embodiment of the operation of the differentiating member of FIG. 5.

FIG. 7 shows the mode of operation of an exemplary embodiment of the differentiating element 1d of FIG. 5. According to this exemplary embodiment, the variation over time of the desired value deviation e or the variation over time of the interior temperature is estimated by determining the interior temperature successively at the points in time $t_a$ and $t_b$, and by estimating the variation over time from the difference in the temperature values determined at these times. The interval in time between $t_a$ and $t_b$ is selected such that a compromise is made between the precision of the estimation of the variation on the one hand and the resolution of small variations on the other hand. A preferred time interval between $t_a$ and $t_b$ lies around half of the waiting time $T_w$. The time $t_b$ can fall at the end of the waiting time.

We claim:

1. A method for controlling an output variable of a process, comprising the steps of:

determining a sample value of the output variable (X);

comparing (S2) the sample value of the output variable (X) with a desired value (w) and determining a desired value deviation (e);

calculating (S3) a value of a manipulated variable (Y) dependent on the determined desired value deviation (e) in such a manner that the output variable (X) of the process is brought near to the desired value (w), and inputting the manipulated variable (Y) into the process; and after lapse of a waiting time (S6) ($T_w$), newly determining (S3) a value of the manipulated variable (Y);

wherein the waiting time ($T_w$) is variable and calculated (S5) on the basis of the difference between the value of the manipulated variable (Y) and an earlier value of the manipulated variable (Y) which was calculated on the basis of an earlier sample value.

2. The method of claim 1, wherein the dependency of the waiting time ($T_w$) on the amount of the difference has a monotonically increasing behavior.

3. The method of claim 2, wherein the waiting time ($T_w$) lasts a first predetermined period of time ($T_{w1}$) when the amount of the difference between the calculated manipulated variable value (Y) and the earlier manipulated variable value (Y) is smaller than a predetermined value and, otherwise, the waiting time ($T_w$) lasts a second predetermined period of time ($T_{w2}$) which is longer than the first period of time.

4. The method of claim 3, wherein the second predetermined period of time is more than 25% longer than the first predetermined period of time.

5. The method of claim 1, comprising the steps of:

determining (S1) a delay time ($T_v$) and/or dead time ($T_{tot}$) of the process; and calculating (S5) the waiting time on the basis of the determined delay time and/or dead time.

6. The method of claim 3, wherein the first predetermined period of time ($T_{w1}$) is longer than or equal to a dead time ($T_{tot}$) of the process.

7. The method of claim 5, wherein the delay time ($T_v$) of the process is determined by the steps of:

subjecting the process to a manipulated variable jump (S10); and after the lapse of a predetermined period of time for determination, determining (S1) the progression over time of the output variable (X).

8. The method of claim 5, wherein the dead time ($T_{tot}$) of the process is determined by the steps of:

subjecting the process to a manipulated variable jump; and determining a period of time beginning at the time ($t_o$) of the manipulated variable jump and up to the time ($T_{tot}$) in which the change in the output variable (X) exceeds a predetermined threshold.

9. The method of claim 5, wherein the delay time ($T_v$) and/or dead time ($T_{tot}$) are periodically determined (S7).

10. The method of claim 1, wherein the calculation of the manipulated variable (Y) comprises the further steps of:

determining (S2) the variation over time of the output variable (X); and calculating the manipulated variable (Y) on the basis of the output variable (X), the variation over time of the output variable (X) and the earlier manipulated variable (Y).

11. The method of claim 10, wherein the variation over time of the output variable is calculated from the difference between two sequential sample values (X(n), X(n−1)) of the output variable (X).

12. The method of claim 11, wherein the time interval between the two successive sample values of the output variable is half the waiting time ($T_w(n)$).

13. The method of claim 1, wherein the manipulated variable (Y) is constant during the waiting time ($T_w$).

14. The method of claim 1, wherein the waiting time ($T_w(n)$) and/or the manipulated variable (Y(n)) is read from a performance characteristic.

15. The method of claim 1, wherein the manipulated variable (Y) and/or the waiting time ($T_w$) are calculated by means of fuzzy logic, comprising the steps of:

defining linguistic terms respectively for the variables (e,de) which serve as a basis for the calculation of the manipulated variable or the waiting time, and respectively for the manipulated variable (Y) and the waiting time ($T_w$);

defining membership functions for each of the linguistic terms;

for each variable, determining the membership value for each term concerned;

inputting the membership value in a rule basis (21) which logically switches the linguistic terms of the input variables with the linguistic terms of the manipulated variable (Y) or waiting time ($T_w$), and calculating a membership function for the manipulated variable (Y) or the waiting time ($T_w$); and defuzzifying the manipulated variable or the waiting time on the basis of its membership function.

16. The method of claim 1, wherein the manipulated variable (Y) is the driving power supplied to a boiler of the absorption refrigeration unit (2) in a refrigerator (2,3,4), that the output variable (X) is the interior temperature of the refrigeration space (3), and the desired value (W) is a preadjustable setting of the interior temperature.

17. The method of claim 5, wherein the determination of the dead time ($T_{tot}$) and/or the delay time ($T_v$) is carried out after a thawing procedure.

18. A controller for controlling an output variable of a process; the controller for determining a sample value of the output variable (X); comparing (S2) the sample value of the output variable (X) with a desired value (w) and determining a desired value deviation (e); calculating (S3) a value of a manipulated variable (Y) dependent on the determined desired value deviation (e) in such a manner that the output variable (X) of the process is brought near to the desired value (w), and inputting the manipulated variable (Y) into the process; and after lapse of a waiting time (S6) ($T_w$), newly determining (S3) a value of the manipulated variable (Y), wherein the waiting time ($T_w$) is variable and calculated (S5) on the basis of the difference between the value of the manipulated variable (Y) and an earlier value of the manipulated variable (Y) which was calculated on the basis of an earlier sample value; the controller comprising:

a means (5) for determining the output variable (X) of the process;

an adjusting means (6) for initially adjusting the desired value (w);

a microprocessor with a main memory and a program memory for receiving a desired value deviation (e) and for the calculation and output of a current value for the manipulated variable (Y);

a means for inputting the manipulated variable into the process;

a memory (1c) for a previously calculated manipulated variable (Y); and a timer (1b) which is designed to receive the previously calculated value of the manipulated variable and the current value of the manipulated variable, to calculate a waiting time ($T_w$) in dependence on these and, after the lapse of this waiting time, to start a new calculation of a value for the manipulated variable (Y) by the microprocessor.

19. The controller of claim 18, comprising a means for calculating the difference between the stored, previous calculated manipulated variable (Y) and the current calculated value of the manipulated variable (Y), the timer (1b) being arranged to calculate the waiting time ($T_w(n)$) in dependence on this difference.

20. The controller of claim 19, wherein the timer (1b) is arranged to provide a first waiting time ($T_{w1}$) when the amount of the difference between the previous value and the current value of the manipulated variable is smaller than a predetermined value, and to provide a second longer waiting time ($T_{w2}$) when the amount of this difference is greater than the threshold value.

21. The controller of claim 18, wherein the timer (1b) is arranged to calculate the waiting time ($T_w$) in dependence on a dead time ($T_{tot}$) and/or delay time ($T_v$) of the process.

22. The controller of claim 18, wherein the means for determining the output variable of the process includes an air temperature sensor (5) and an analog/digital converter, and wherein the means for inputting the manipulated variable into the process has an adjusting element for adjusting the power to be supplied to the process.

23. The controller of claim 18, comprising a means (1d) for determining the variation over time of the output variable and inputting the determined variation value into the microprocessor.

24. The controller of claim 18, wherein a performance characteristic memory is provided for calculating the manipulated variable (Y) and/or the waiting time ($T_w$).

25. The controller of claim 23, comprising:

means (20a) for fuzzifying a deviation of the output variable (X) from a previously set desired value (w);

means (20b) for fuzzifying the determined variation value (de);

means (20c) for fuzzifying the earlier calculated manipulated value;

means (21) for storing fuzzy-logic rules for use by the microprocessor; and means (22) for defuzzifying a fuzzy set of the output variable (X) issued by the microprocessor.

* * * * *